United States Patent Office 2,750,409
Patented June 12, 1956

2,750,409

CARBOXYLIC ACID ESTERS OF HYDROXY SUBSTITUTED CARBOCYCLIC KETONES

Ferdinand C. Meyer and Angelo J. Speziale, Kirkwood, Mo., assignors to Monsanto Chemical Company, St. Louis, Mo., a corporation of Delaware No Drawing. Application October 11, 1952,
Serial No. 314,416

11 Claims. (Cl. 260—476)

This invention relates to new and useful carboxylic acid esters of hydroxy substituted carbocyclic bicyclic ketones. More specifically this invention relates to keto-esters of the structural formula

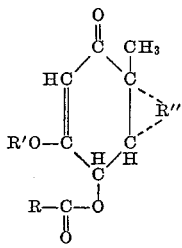

where R is hydrogen or a hydrocarbon radical such as the alkyl, aralkyl, cycloalkyl, aryl and alkaryl radicals, where R' is a short chain alkyl radical such as methyl, ethyl, propyl, butyl, amyl, etc., and where R'' is a 4-carbon atom chain containing 6 hydrogen atom substituents, such as

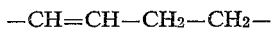

and

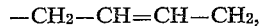

which carbon atom chain links adjacent or ortho carbon atoms as described forming a 6-membered fused carbocyclic ring.

The new esters are particularly useful for the preparation of the corresponding bicyclic glycols

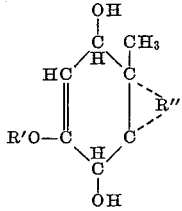

which glycols are readily obtained in good yields by reacting the keto-ester with lithium aluminum hydride. Many of these glycols are useful in the synthesis of steroids (J. A. C. S., vol. 74, September 1952, p. 4223).

The new esters are also useful plasticizers for cellulose nitrate.

It will be obvious to those skilled in the art that the new compounds of this invention contain three optically active carbon atoms. As a result thereof, these compounds may exist in eight optically active isomeric forms or four racemates. All such forms of the new esters are contemplated as coming within the scope of this invention.

As illustrative of the new compounds and the preparation thereof is the following.

Example I

To a suitable reaction vessel containing 44.7 parts by weight (substantially 0.214 mol) of dl-trans-1-hydroxy-4 - keto - 2 - methoxy - 4a - methyl - 1,4,4a,5,8,8a - hexahydronaphthalene and approximately 190 parts by weight of pyridine is added 46.5 parts by weight (substantially 0.46 mol) of acetic anhydride. The mix so obtained is agitated for 21 hours at about 25–28° C. Upon application of vacuum the solvent is removed by distillation and the oily residue taken up with approximately 135 parts by weight of benzene. The benzene solution is washed successively with 25 parts by weight of water, 25 parts by weight of a 5% sodium bicarbonate solution and 25 parts by weight of water. Upon distilling of the benzene there is obtained 53.2 parts by weight of a white solid identified as dl-trans-1-acetyloxy-4-keto-2-methoxy-4a-methyl-1,4,4a,5,8,8a-hexahydronaphthalene possessing a melting point of 84–85° C.

Example II

To a suitable reaction vessel containing 45.0 parts by weight (substantially 0.217 mol) of dl-trans-1-hydroxy-4-keto - 2 - methoxy - 4a - methyl - 1,4,4a,5,8,8a - hexahydronaphthalene and approximately 100 parts by weight of pyridine in slowly added with agitation 25.6 (substantially 0.24 mol) of n-butyryl chloride while maintaining the temperature at 0–5° C. The mix is allowed to stand for 18 hours at room temperature and then is poured into 1000 parts by weight of ice water. The water-oil mix obtained is extracted with approximately 250 parts by weight of chloroform. The chloroform extract is washed successively with 25 parts by weight of water, 25 parts by weight of a 5% sodium bicarbonate solution and 25 parts by weight of water. Upon distilling of the chloroform there is obtained 60.8 parts by weight of a light yellow oil identified as dl-trans-1-n-butyryloxy-4-keto-2-methoxy - 4a - methyl - 1,4,4a,5,8,8a - hexahydronaphthalene possessing a refractive index at 25° C. of 1.5174.

Example III

To a suitable reaction vessel containing 32.7 parts by weight (substantially 0.157 mol) of dl-trans-1-hydroxy-4-keto - 2 - methoxy - 4a - methyl - 1,4,4a,5,8,8a - hexahydronaphthalene and approximately 150 parts by weight of pyridine is slowly added with agitation 28.1 parts by weight (substantially 0.20 mol) of benzoyl chloride while maintaining the temperature at 5–10° C. The mix is allowed to stand for 16.5 hours at about 26° C. and then poured into 800 parts by weight of cold water and the cooled mix so obtained filtered. Approximately 45.0 parts by weight of a light yellow solid identified as dl-trans - 1 - benzoyloxy - 4 - keto - 2 - methoxy - 4a - methyl-1,4,4a,5,8,8a-hexahydronaphthalene possessing a melting point of 145.2–146.2° C. is obtained.

Example IV

Employing the procedure of Example II but replacing butyryl chloride with an equimolecular amount of 2-ethylhexanoyl chloride substantially pure dl-trans-1-(2-ethylhexanoyloxy) - 4 - keto - 2 - methoxy - 4a - methyl - 1,4,-4a, 5, 8, 8a-hexahydronaphthalene is obtained in an excellent yield.

Example V

Employing the procedure of Example II but replacing butyryl chloride with an equimolecular amount of phenylacetyl chloride substantially pure dl-trans-1-phenylacetyloxy - 4 - keto - 2 - methoxy - 4a - methyl - 1,4,4a-5,8,8a-hexahydronaphthalene is obtained in an excellent yield.

Example VI

In accordance with the procedure of Example II an excellent yield of unresolved 1-cyclohexanoyloxy-4-keto-2 - methoxy - 4a - methyl - 1,4,4a,5,8,8a - hexahydronaphthalene is obtained employing the following reactants:

| | Parts by weight |
|---|---|
| Unresolved 1-hydroxy-4-keto-2-methoxy-4a-methyl-1,4,4a,5,8,8a-hexahydronaphthalene | 19.4 |
| Cyclohexanoyl chloride | 8.5 |
| Pyridine | 50.0 |

*Example VII*

In accordance with the procedure of Example II an excellent yield of *dl* - trans - 1 - caproyloxy - 4 - keto - 2 - n - butoxy - 4a - methyl - 1,4,4a,5,6,8a - hexahydronaphthalene is obtained employing the following reactants:

| | Parts by weight |
|---|---|
| *dl*-trans-1-hydroxy-4-keto-2-n-butoxy-4a-methyl-1,4,4a,5,6,8a-hexahydronaphthalene | 2.0 |
| Caproyl chloride | 2.0 |
| Pyridine | 20.0 |

*Example VIII*

In accordance with the procedure of Example II an excellent yield of unresolved 1 - isobutyryloxy - 4 - keto - 2 - ethoxy - 4a - methyl - 1,4,4a,5,8,8a - hexahydronaphthalene is obtained employing the following reactants:

| | Parts by weight |
|---|---|
| Unresolved 1-hydroxy-4-keto-2-ethoxy-4a-methyl-1,4,4a,5,8,8a-hexahydronaphthalene | 2.1 |
| Isobutyryl chloride | 1.3 |
| Pyridine | 20.0 |

*Example IX*

In accordance with the procedure of Example II an excellent yield of unresolved 1 - n - pentanoyloxy - 4 - keto - 2 - methoxy - 4a - methyl - 1,4,4a,7,8,8a - hexahydronaphthalene is obtained employing the following reactants:

| | Parts by weight |
|---|---|
| Unresolved 1-hydroxy-4-keto-2-methoxy-4a-methyl-1,4,4a,7,8,8a-hexahydronaphthalene | 4.2 |
| n-Pentanoyl chloride | 3.0 |
| Pyridine | 35.0 |

*Example X*

In accordance with the procedure of Example II an excellent yield of unresolved 1 - (2 - ethyl - hexanoyloxy) - 4 - keto - 2 - n - propoxy - 4a - methyl - 1,4,4a,5,8,8a - hexahydronaphthalene is obtained employing the following reactants:

| | Parts by weight |
|---|---|
| Unresolved 1-hydroxy-4-keto-2-n-propoxy-4a-methyl-1,4,4a,5,8,8a-hexahydronaphthalene | 2.4 |
| 2-ethyl hexanoyl chloride | 2.0 |
| Pyridine | 20.0 |

*Example XI*

In accordance with the procedure of Example II an excellent yield of *dl* - trans - 1 - n - butyryloxy - 4 - keto - 2 - ethoxy - 4a - methyl - 1,4,4a,7,8,8a - hexahydronaphthalene is obtained employing the following reactants:

| | Parts by weight |
|---|---|
| *dl*-Trans-1-hydroxy-4-keto-2-ethoxy-4a-methyl-1,4,4a,7,8,8a-hexahydronaphthalene | 2.7 |
| n-Butyryl chloride | 1.4 |
| Pyridine | 25.0 |

*Example XII*

In accordance with the procedure of Example II an excellent yield of unresolved 1 - phenylacetyloxy - 4 - keto - 2 - methoxy - 4a - methyl - 1,4,4a,7,8,8a - hexahydronaphthalene is obtained employing the following reactants:

| | Parts by weight |
|---|---|
| Unresolved-1-hydroxy-4-keto-2-methoxy-4a-methyl-1,4,4a,7,8,8a-hexahydronaphthalene | 10.4 |
| Phenylacetyl chloride | 9.3 |
| Pyridine | 50.0 |

*Example XIII*

In accordance with the procedure of Example II an excellent yield of unresolved 1 - p - toluyloxy - 4 - keto - 2 - methoxy - 4a - methyl - 1,4,4a,5,8,8a - hexahydronaphthalene is obtained employing the following reactants:

| | Parts by weight |
|---|---|
| Unresolved 1-hydroxy-4-keto-2-methoxy-4a-methyl-1,4,4a,5,8,8a-hexahydronaphthalene | 2.7 |
| p-Toluyl chloride | 1.7 |
| Pyridine | 10.0 |

*Example XIV*

In accordance with the procedure of Example II an excellent yield of *d* - trans - 1 - decanoyloxy - 4 - keto - 2 - methoxy - 4a - methyl - 1,4,4a,5,8,8a - hexahydronaphthalene is obtained employing the following reactants:

| | Parts by weight |
|---|---|
| *d*-Trans-1-hydroxy-4-keto-2-methoxy-4a-methyl-1,4,4a,5,8,8a-hexahydronaphthalene | 4.2 |
| Decanoyl bromide | 4.2 |
| Pyridine | 25.0 |

In addition to the esters prepared in the preceding examples, the following examples are further illustrations of compounds coming within the scope of this invention:

1 - n - propanoyloxy - 4 - keto - 2 - methoxy - 4a - methyl-1,4,4a,5,8,8a-hexahydronaphthalene 1 - n - octanoyloxy - 4 - keto - 2 - methoxy - 4a - methyl-1,4,4a,5,8,8a-hexahydronaphthalene 1 - n - octadecanoyloxy - 4 - keto - 2 - methoxy - 4a - methyl-1,4,4a,5,8,8a-hexahydronaphthalene 1 - naphthoyloxy - 4 - keto - 2 - methoxy - 4a - methyl-1,4,4a,5,8,8a-hexahydronaphthalene 1 - isobutyryloxy - 4 - keto - 2 - methoxy - 4a - methyl-1,4,4a,5,6,8a-hexahydronaphthalene 1 - formyloxy - 4 - keto - 2 - n - butoxy - 4a - methyl-1,4,4a,5,8,8a-hexahydronaphthalene 1 - caproyloxy - 4 - keto - 2 - methoxy - 4a - methyl - 1,4,-4a,5,8,8a,hexahydronaphthalene 1 - isobutyryloxy - 4 - keto - 2 - methoxy - 4a - methyl-1,4,4a,7,8,8a-hexahydronaphthalene 1 - octanoyloxy - 4 - keto - 2 - ethoxy - 4a - methyl - 1,4-4a,7,8,8a-hexahydronaphthalene 1 - benzoyloxy - 4 - keto - 2 - ethoxy - 4a - methyl - 1,4,4a,-5,8,8a-hexahydronaphthalene 1 - o - toluyoxy - 4 - keto - 2 - methoxy - 4a - methyl - 1,4,-4a,5,8,8a-hexahydronaphthalene 1 - cyclohexanoyloxy - 4 - keto - 2 - ethoxy - 4a - methyl-1,4,4a,5,8,8a-hexahydronaphthalene 1 - phenylpropanoyloxy - 4 - keto - 2 - methoxy - 4a - methyl-1,4,4a,5,8,8a-hexahydronaphthalene The new esters of this invention wherein R is an alkyl radical containing 1–17 carbon atoms represent a preferred embodiment of this invention. Of this preferred embodiment the esters wherein R is an alkyl radical containing 3–7 carbon atoms have been found particularly useful.

The keto-alcohol reactants employed in the preparation of the new keto-esters are readily prepared by partially reducing the corresponding 1,4-diketo-compound, as for example by reacting a mixture comprising zinc dust, acetic acid and a 1,4-diketo compound of the formula

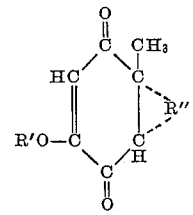

where R' and R" have the same significance as aforedescribed. Such 1,4-diketo compounds are important intermediates in the total synthesis of steroids having cortisone-like activity (J. A. C. S., vol. 74, p. 4223, September 1952).

The 1-hydroxy-4-keto-2-alkoxy-4a-methyl-1,4,4a,5,8,8a-hexahydronaphthalene reactants are described and claimed in our application Serial No. 272,265, filed February 18, 1952, now abandoned.

Although the preceding examples have described certain specific embodiments of this invention both as to the nature of the novel esters and their method of preparation, it is to be understood that substantial variations obvious to those skilled in the art in the reactants and reaction conditions, e. g. with acid halides 0–50% by weight excess of theory thereof may be employed, temperatures in the range of about —10° C. to 50° C. may be used, etc., set forth above may be made without departing from the spirit or scope of this invention.

What is claimed is:

1. As new compounds esters of the structural formula

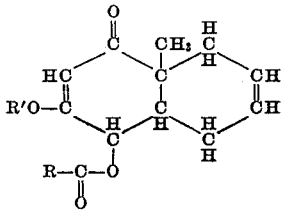

where R is a member of the group consisting of hydrogen, alkyl, aralkyl, cycloalkyl, aryl and alkaryl radicals and where R' is a short chain alkyl radical.

2. As new compounds esters of the structural formula

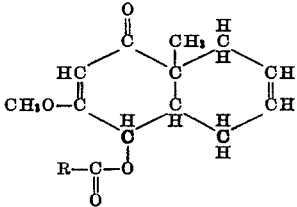

where R is an alkyl radical containing 1 to 17 carbon atoms.

3. As new compounds esters of the structural formula

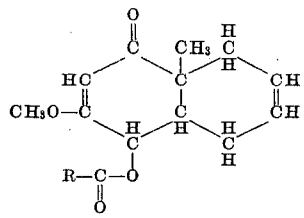

where R is an alkyl radical containing 3 to 7 carbon atoms.

4. 1 - benzoyloxy - 4 - keto - 2 - methoxy - 4a - methyl-1,4,4a,5,8,8a-hexahydronaphthalene 5. 1 - (2 - ethyl - hexanoyloxy) - 4 - keto - 2 - methoxy-4a-methyl-1,4,4a,5,8,8a-hexahydronaphthalene 6. *dl* - Trans - 1 - acetyloxy - 4 - keto - 2 - methoxy - 4a-methyl-1,4,4a,5,8,8a-hexahydronaphthalene.

7. *dl* - Trans - 1 - n - butyryloxy - 4 - keto - 2 - methoxy-4a-methyl-1,4,4a,5,8,8a-hexahydronaphthalene.

8. The process of making the esters of claim 2 which comprises reacting a keto-alcohol of the formula

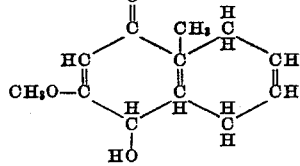

and an acid chloride of the formula

where R is an alkyl radical containing from 1 to 17 carbon atoms, in pyridine.

9. The process of claim 8 employing a reaction temperature in the range of from about —10° C. to 50° C.

No references cited.